US012771161B2

(12) United States Patent
Romo

(10) Patent No.: US 12,771,161 B2
(45) Date of Patent: Oct. 20, 2026

(54) TRANSFORMERLESS ON-BOARD BATTERY CHARGING SYSTEM FOR AN ELECTRIC VEHICLE

(71) Applicant: LiveWire EV, LLC, Milwaukee, WI (US)

(72) Inventor: Hector Romo, Salinas, CA (US)

(73) Assignee: Live Wire EV, LLC, Milwaukee, WI (US)

( * ) Notice: Subject to any disclaimer, the term of this patent is extended or adjusted under 35 U.S.C. 154(b) by 734 days.

(21) Appl. No.: 18/343,372

(22) Filed: Jun. 28, 2023

(65) Prior Publication Data

US 2025/0007312 A1 Jan. 2, 2025

(51) Int. Cl.

| | |
|---|---|
| ***H02J 7/00*** | (2026.01) |
| ***B60L 53/22*** | (2019.01) |
| ***B60L 53/62*** | (2019.01) |
| ***H02J 7/80*** | (2026.01) |
| ***H02J 7/90*** | (2026.01) |
| ***H02J 7/96*** | (2026.01) |

(52) U.S. Cl.

CPC ................ *H02J 7/96* (2026.01); *B60L 53/22* (2019.02); *B60L 53/62* (2019.02); *H02J 7/80* (2026.01); *H02J 7/927* (2026.01); *B60L 2200/12* (2013.01); *B60L 2240/547* (2013.01)

(58) Field of Classification Search

CPC ........................................................ H02J 7/96
USPC ........................................................ 320/109
See application file for complete search history.

(56) References Cited

U.S. PATENT DOCUMENTS

| | | | | |
|---|---|---|---|---|
| 9,566,867 | B2 | 2/2017 | Kydd | |
| 9,837,900 | B2 | 12/2017 | Sylla | |
| 9,873,341 | B2 * | 1/2018 | Albanna | B60L 53/22 |
| 10,205,407 | B2 | 2/2019 | Ginart et al. | |
| 10,562,404 | B1 * | 2/2020 | Khaligh | B60L 50/10 |
| 2005/0088144 | A1 * | 4/2005 | Pacholok | H02J 7/02 320/131 |
| 2008/0055946 | A1 * | 3/2008 | Lesso | H02M 3/1582 363/63 |
| 2021/0213833 | A1 | 7/2021 | Narayanan et al. | |

* cited by examiner

*Primary Examiner* — Yalkew Fantu
(74) *Attorney, Agent, or Firm* — Michael Best & Friedrich LLP

(57) ABSTRACT

A transformerless charging system including a charging circuit including a first switch and a second switch, a first sensor assembly configured to measure a voltage of the battery, a second sensor assembly configured to measure a voltage of an input power line, and a third sensor assembly configured to measure a current of the charging circuit. An electronic processor is configured to receive a voltage of the battery, receive a voltage of the input power line, compare the voltage of the battery to the voltage of the input power line, and in response to the voltage of the input power line being greater than or approaching the voltage of the battery, turn off a PWM signal to the first switch, and with the PWM signal off, receive a current of the charging circuit and, in response to the current of the charging circuit being 0 Amps, open the second switch.

20 Claims, 5 Drawing Sheets

TRANSFORMERLESS ON-BOARD BATTERY CHARGING SYSTEM FOR AN ELECTRIC VEHICLE

TECHNICAL FIELD

Embodiments described herein generally relate to electric vehicles and, in particular, electric vehicle battery chargers.

SUMMARY

Many electric vehicles utilize a transformer in the charging infrastructure to convert AC power from the grid into DC power for charging the vehicle battery. The transformer steps down the high voltage AC power from the grid to a lower voltage level suitable for charging the vehicle battery. This voltage conversion ensures efficient and safe charging of the vehicle battery. However, using a transformer in the charging infrastructure can add cost, size, and complexity to the vehicle, which can make it more difficult to deploy and maintain. In addition, transformers can be inefficient and can introduce energy losses, which can reduce the overall efficiency of the charging system. Additionally, charging systems that include a transformer may be bulky and, thus, may be located in a charging station external to the vehicle. However, in this situation, to charge the vehicle battery, the vehicle operator must find an appropriate charging station.

To overcome these and other challenges, embodiments described herein provide a transformerless charging configuration. Transformerless configurations use other components, such as capacitors and resistors, to convert AC power from the grid into DC power for charging the vehicle battery. Eliminating the need for a transformer reduces the cost, size, and complexity of the charging infrastructure. Furthermore, by eliminating the transformer, the charging system may advantageously be included onboard the vehicle, allowing the operator to more conveniently charge the vehicle battery (e.g., without having to locate a specialized charging station). As also described herein, the transformerless charging system provides input and output filtering, grounding, and protection to provide reliable operation even when receiving power from a power grid, which may provide inconsistent power. Accordingly, the on-board charging system uses a power factor correction, non-isolated stage to charge an electric vehicle battery for various operation conditions (e.g., a full range of battery state of charge) of a high voltage stage of charge.

Embodiments described herein are directed to a transformerless on-board battery charging system for a vehicle, the system including a rechargeable battery and a charging circuit, the charging circuit electrically coupled to the rechargeable battery, the charging circuit including a first switch configured to receive a pulse width modulated (PWM) signal and a second switch. The system includes a first sensor assembly configured to measure a voltage of the rechargeable battery, a second sensor assembly configured to measure a voltage of an input power line supplying power to the charging circuit from a power supply external to the vehicle, and a third sensor assembly configured to measure a current of the charging circuit. The system further includes a controller including an electronic processor configured to receive a measurement of the voltage of the rechargeable battery from the first sensor assembly, receive a measurement of the voltage of the input power line from a second sensor assembly, and compare the measurement of the voltage of the rechargeable battery to the measurement of the voltage of the input power line. In response to the measurement of the voltage of the input power line being greater than or approaching the measurement of the voltage of the rechargeable battery, the electronic processor is configured to turn off the PWM signal to the first switch, and with the PWM signal to the first switch is turned off, receive a measurement of the current of the charging circuit from the third sensor assembly and, in response to the measurement of the current of the charging circuit being approximately 0 Amps, open the second switch.

In some embodiments, the electronic processor is further configured to, with the second switch open and in response to the measurement of the voltage of the rechargeable electric vehicle battery being greater than or exceeding the measurement of the voltage of the input power line by a predetermined amount, close the second switch, and with the second switch closed and in response to the measurement of the current of the charging circuit being greater than 0 Amps, turn on the PWM signal to the first switch.

In some embodiments, the charging circuit includes a third switch and wherein the electronic processor is configured to, in response to the measurement of the voltage of the input power line being greater than or approaching the measurement of the voltage of the rechargeable battery, turn off the PWM signal to the first switch and the third switch.

In some embodiments, the PWM signal received by the third switch is approximately 180 degrees out of phase from the PWM signal received by the first switch. In some embodiments, the third sensor assembly includes a current sensor. In some embodiments, the electronic processor is configured to turn off the PWM signal to the first switch in response to the measurement of the voltage of the input power line being greater than or approaching the measurement of the voltage of the rechargeable battery by comparing the measurement of the voltage of the input power line to a predetermined threshold value, and turning off the PWM signal to the first switch in response to the measurement of the voltage of the input power line being greater than the predetermined threshold value.

In some embodiments, the electronic processor is configured to set the predetermined threshold based on the voltage of the rechargeable electric vehicle battery. In some embodiments, the electronic processor is configured to set the predetermined threshold to a value a predetermined number of volts below the voltage of the rechargeable electric vehicle battery. In some embodiments, the predetermined number of volts is 25 Volts.

Embodiments described herein are directed to a method of charging an on-board battery for an electric vehicle with a transformerless on-board battery charging system, the method including receiving, from a first sensor assembly, a measurement of a voltage of a rechargeable electric vehicle battery, receiving, from a second sensor assembly, a measurement of a voltage of an input power line, and comparing, with an electronic processor, the measurement of the voltage of the rechargeable electric vehicle battery to the measurement the voltage of the input power line. The method includes, in response to the measurement of the voltage of the input power line being greater than or approaching the measurement of the voltage of the rechargeable battery, turning off the PWM signal to the first switch, and with the PWM signal to the first switch is turned off, receiving a measurement of the current of the charging circuit from the third sensor assembly and, in response to the measurement of the current of the charging circuit being approximately 0 Amps, opening the second switch.

In some embodiments, the charging circuit includes a third switch and wherein turning off the PWM signal to the first switch in response to the measurement of the voltage of the input power line being greater than or approaching the predetermined threshold value includes turning off the PWM signal to the first switch and the second switch, wherein the PWM signal received by the third switch is approximately 180 degrees out of phase from the PWM signal received by the first switch. In some embodiments, the first sensor assembly includes a current sense transformer. In some embodiments, the maximum voltage of the rechargeable electric vehicle battery is approximately 400 Volts. In some embodiments, the input power line is a sine wave of between approximately-200 Volts and 200 Volts.

Embodiments herein are directed to a transformerless on-board battery charging system for an electric vehicle, the system including a charging circuit including a first switch configured to receive a PWM signal and a second switch, and a controller. The controller includes an electronic processor configured to receive a measurement of the voltage of a battery, receive a measurement of a voltage of an input power line, and compare the measurement of the voltage of the rechargeable electric vehicle battery to a predetermined threshold value. The electronic process is further configured to compare the measurement of the voltage of the input power line to the predetermined threshold value, and in response to the measurement of the voltage of the input power line being greater than or approaching the predetermined threshold value, turn off the PWM signal to the first switch, and with the PWM signal to the first switch is turned off, receive a measurement of the current of the charging circuit and, in response to the measurement of the current of the charging circuit being approximately 0 Amps, open the second switch.

In some embodiments, the charging circuit includes a third switch and wherein the electronic processor is configured to, in response to the measurement of the voltage of the input power line being greater than or approaching the predetermined threshold value, turn off the PWM signal to the first switch ad the third switch. In some embodiments, the PWM signal received by the third switch is approximately 180 degrees out of phase from the PWM signal received by the first switch. In some embodiments, the second sensor assembly includes a current sensor. In some embodiments, the maximum voltage of the battery is approximately 400 Volts. In some embodiments, the input power line is a sine wave of between approximately-200 Volts and 200 Volts.

Other independent aspects will become apparent by consideration of the detailed description and accompanying drawings.

DETAILED DESCRIPTION

Figure 1:
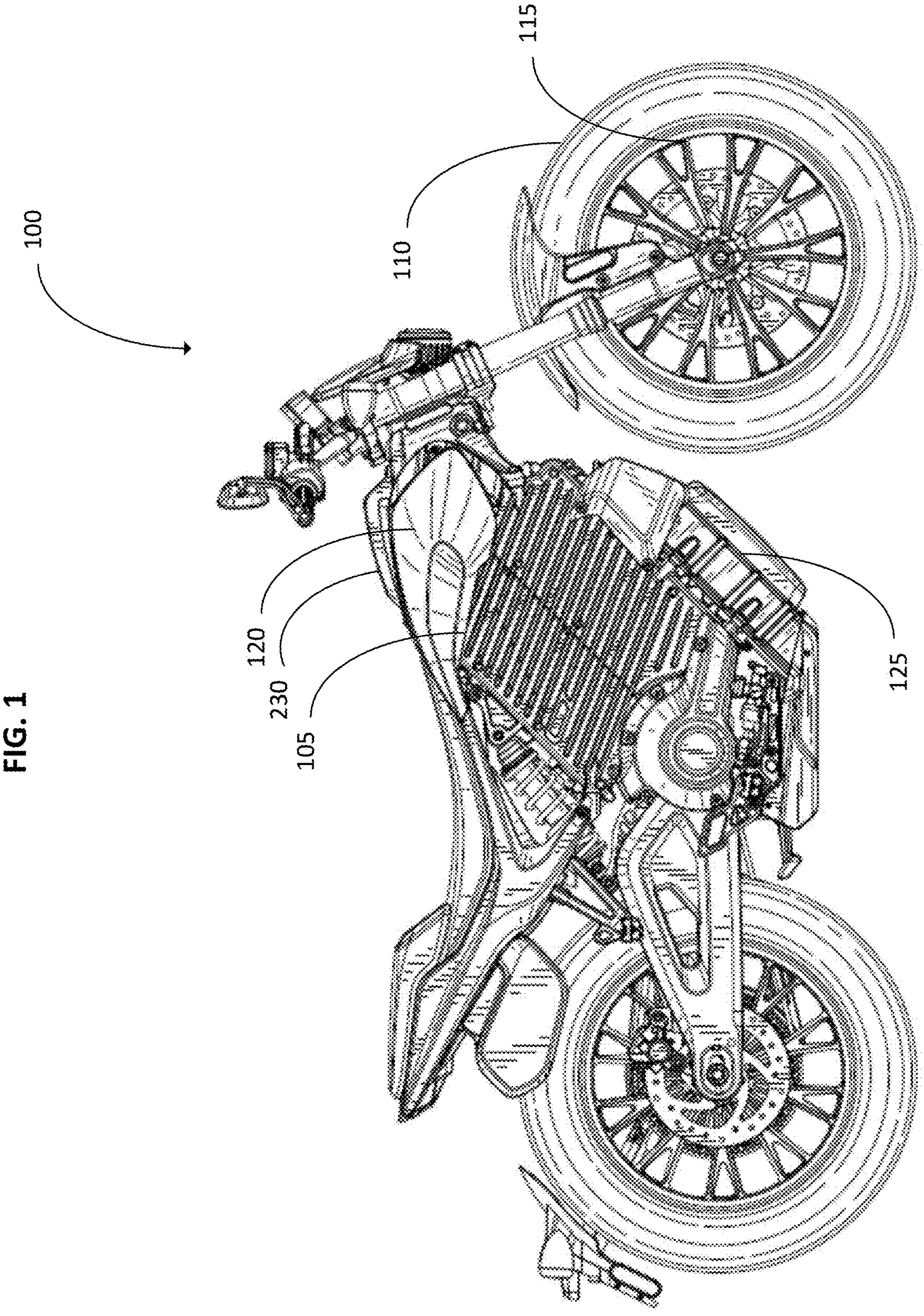
FIG. 1 is a side view of an electric vehicle according to some aspects and embodiments.

Before any independent embodiments are explained in detail, it is to be understood that the methods and systems described herein are not limited in their application to the details of construction and the arrangement of components set forth in the following description or illustrated in the following drawings. The systems and methods described herein are capable of other independent embodiments and of being practiced or of being carried out in various ways. Some embodiments described herein may be integral to a vehicle while others may be peripheral to a vehicle controller or distributed between an integral component and a peripheral component.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". In another example, the expression "approximately 0" may disclose the absence of a value to within at least a degree of reasonable tolerance. The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware. Also, if an apparatus, method, or system is claimed, for example, as including a controller, module, logic, electronic processor, or other element configured in a certain manner, for example, to perform multiple functions, the claim or claim element should be interpreted as meaning one or more controllers, modules, logic elements, electronic processors other elements where any one of the one or more elements is configured as claimed, for example, to perform any one or more of the recited multiple functions.

FIG. 1 is a side view of an electric vehicle according to some examples and aspects. The electric vehicle in FIG. 1 is illustrated as an electric motorcycle 100. However, it should be understood that the methods and systems described herein are not limited to use on motorcycles but may be used in other types of vehicles. Furthermore, in some embodiments, the methods and systems described herein may be used hybrid vehicles or any type of vehicle including a rechargeable power source for powering one or more components or aspects of the vehicle. As illustrated in FIG. 1, the motorcycle 100 includes an electric motor 105, tires 110 on wheels 115, and a rechargeable power source, such as a battery 125. The battery 125 is electrically coupled to the electric motor 105 and supplies power to the electric motor 105. The battery 125 can be charged by plugging a charging cable into a charging interface 230 of the motorcycle 100, wherein the charging cable provides a supply of power, such as, for example, alternating current (AC) power from the power grid. Depending on the battery's capacity and the motorcycle 100 energy efficiency, the motorcycle 100 may have a range of anywhere from 50 to 200 miles on a single charge. In some instances, this range corresponds with a fully charged battery voltage of approximately 200 Volts to 400 Volts. As the motorcycle 100 operates, the battery voltage depletes from a fully charged state to a drained state. In the instance where a fully charged state is 400 Volts, a drained state may be, for example, approximately 200 Volts. The battery 125 may be made of different materials, such as, for example, lithium-ion batteries. Other compositions may include nickel-metal hydride, nickel-cadmium, solid state, or sodium-ion batteries. The battery 125 may take alternative forms, such as being composed of multiple smaller battery banks or supercapacitor banks.

As noted above, in some embodiments, the charging cable may provide power to the battery 125 from a standard electrical outlet. Alternatively, the charging cable may provide power to the battery from a charging station configured to provide a higher input voltage and faster charging rates than a standard electrical outlet. In either case, the input power may be provided as an alternating current (AC) sine wave that oscillates in magnitude. For example, the voltage of the input power may be a span of generally 400 Volts from positive 200 Volts to negative 200 Volts, plus and/or minus a volt tolerance, which may be approximately 25 Volts.

In a circumstance where the voltage of the input power (also referred to herein as the input power voltage) is greater than the voltage of the battery 125 (e.g., the output voltage of the power factor correction stage), such as when the battery 125 is in a drained state (such as, for example, when the battery 125 has a state of charge of 5% to 10%), charging the battery 125 may cause an undesired inrush of current to the battery 125 (e.g., a surge of current through a diode). This undesired current may cause poor total harmonic distortion and hardware failures, which may cause damage to the battery 125 or charging system 200 or cause inefficient charging, prolonging the time required to charge the battery 125.

Figure 2:
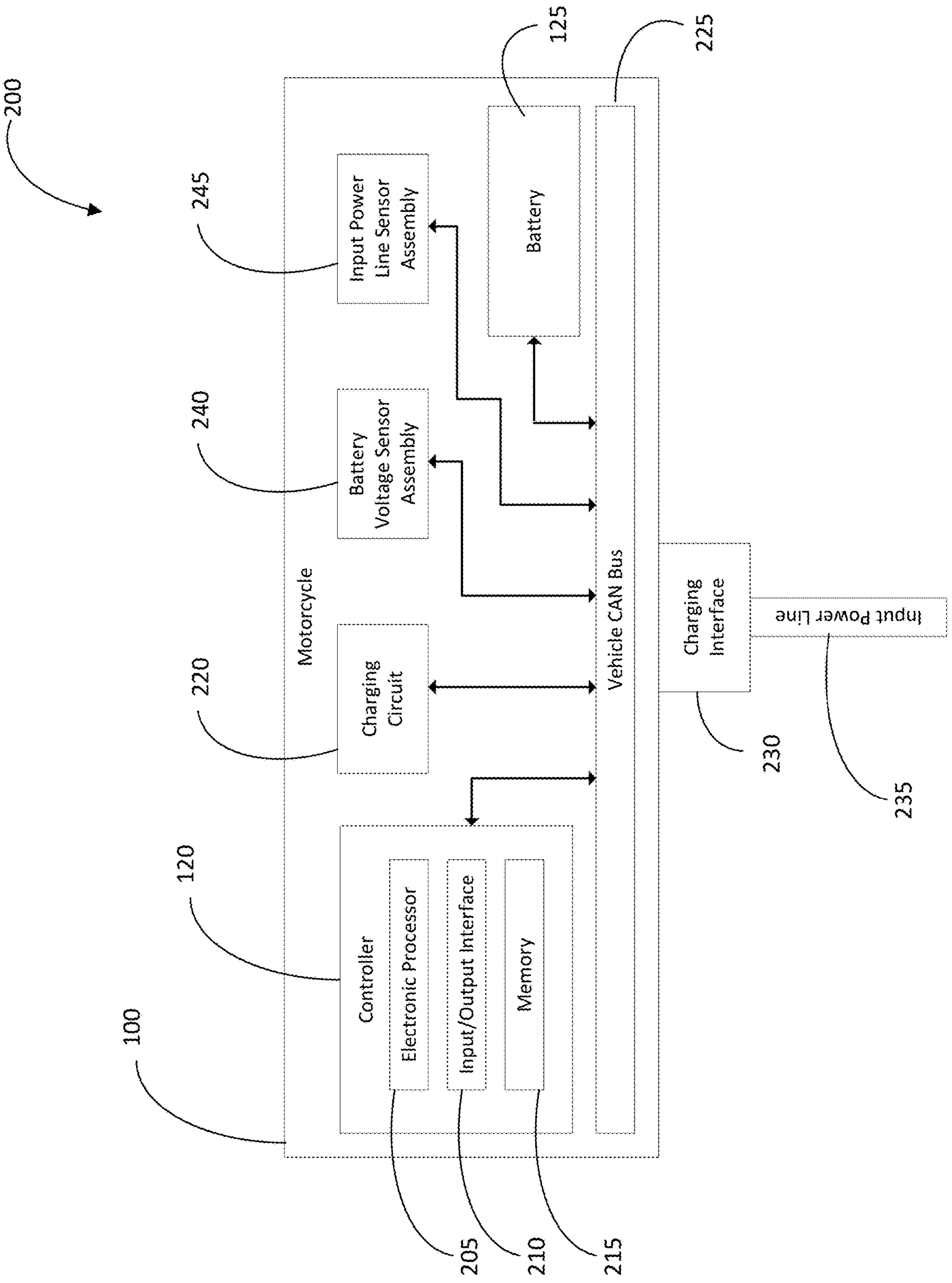
FIG. 2 is a block diagram a control system for the electric vehicle of FIG. 1 according to some aspects and embodiments.

To solve these and other issues, the motorcycle 100 includes an on-board transformerless charging system 200, as schematically illustrated in FIG. 2. The system 200 includes a controller 120, which may include an electronic processor 205, an input/output interface 210, and a memory 215. In some examples the controller 120 is integrated with a charging circuit 220. However, in the example shown in FIG. 2, the controller 120 and the charging circuit 220 are separate and communicate with each other via a controller area network bus interface, also referred to as CAN bus 225, or similar wired or wireless connection. When the controller 120 and the charging circuit 220 are separate, the charging circuit 220 may also include an electronic processor, an input/output interface, and a memory separate from those of the controller 120.

In some examples, the electronic processor 205 is implemented as a microprocessor with separate memory, for example the memory 215. In other examples, the electronic processor 205 may be implemented as a microcontroller (with memory 215 on the same chip). In other examples, the electronic processor 205 may be implemented using multiple processors. In addition, the electronic processor 205 may be implemented partially or entirely as, for example, a field-programmable gate array (FPGA), an applications specific integrated circuit (ASIC), and the like and the memory 215 may not be needed or be modified accordingly. In some examples, the memory 215 includes non-transitory, computer-readable memory that stores instructions that are received and executed by the electronic processor 205 to carry out methods described herein. The memory 215 may include, for example, a program storage area and a data storage area. The program storage area and the data storage area may include combinations of different types of memory, for example read-only memory and random-access memory. The input/output interface 210 may include one or more input mechanisms and one or more output mechanisms (for example, general-purpose input/outputs (GPIOs), analog inputs, digital inputs, and others).

As illustrated in FIG. 2, the charging interface 230 electrically couples the charging circuit 220 to a charging cable or connector, which acts as an input power line 235 supplying power from a power source, such as a power grid. As previously described, the input power line 235 is configured to provide power to the charging circuit 220 to charge the battery 125.

The system 200 also includes a battery voltage sensor assembly 240 including one or more sensors configured to measure a voltage of the battery 125. The system 200 further includes an input power line sensor assembly 245 including one or more sensors configured to measure a voltage of the input power line 235. The battery voltage sensor assembly 240 and the input power line sensor assembly 245 may communicate measured voltage values to the controller 120. The battery voltage sensor assembly 240, the input power line sensor assembly 245, or both may measure voltage directly or indirectly by measuring other electrical characteristics of the battery 125 and input power line 235, respectively. In some embodiments, the battery voltage sensor assembly 240, the input power line sensor assembly 245, or both are integrally formed with the controller 120 or the charging circuit 220.

Figure 3:
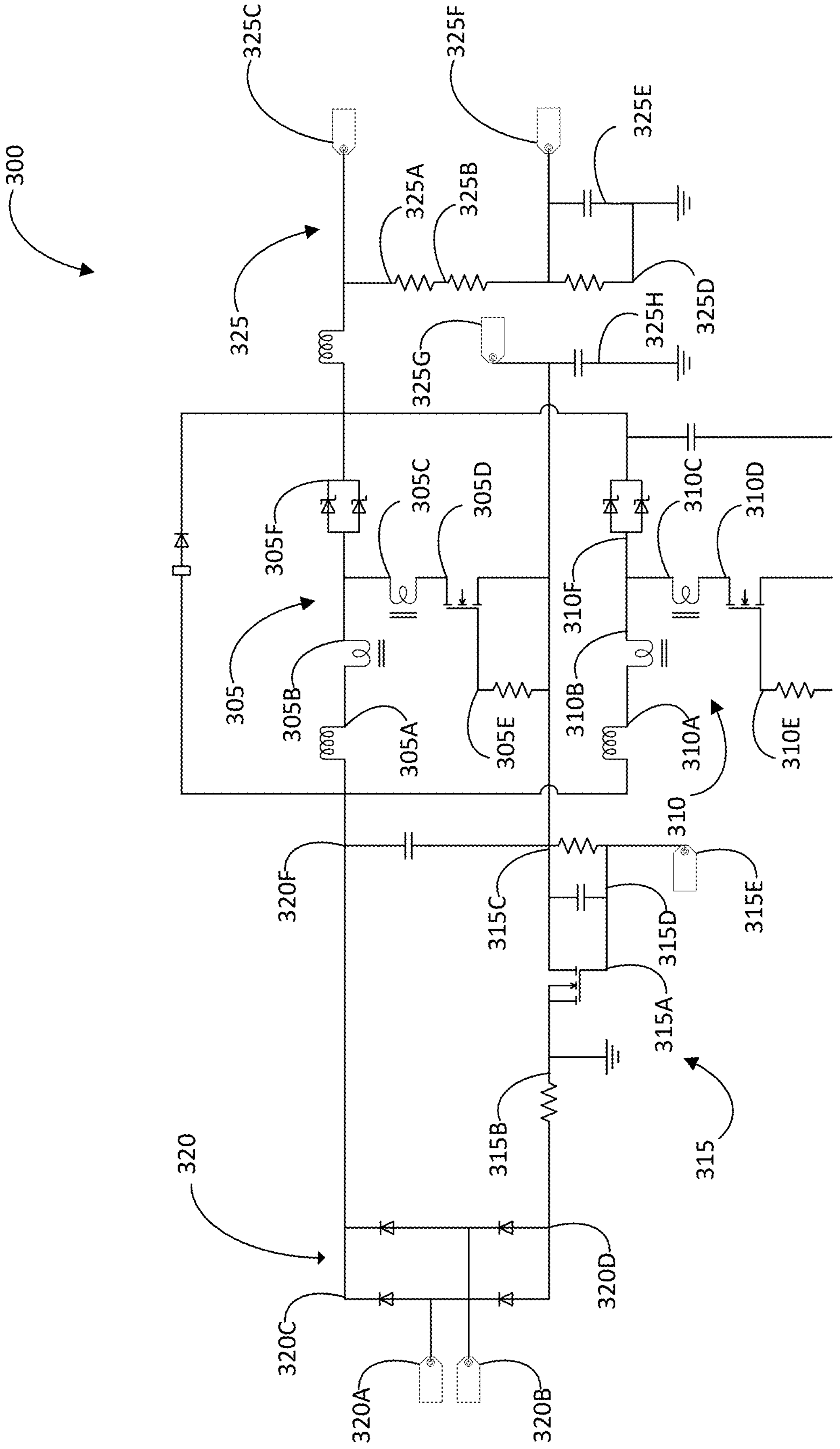
FIG. 3 is a circuit diagram of a transformerless battery charging system included in the control system of FIG. 2 according to some aspects and embodiments.

FIG. 3 is a circuit diagram of the charging circuit 220 according to some aspects and embodiments. The charging circuit 220 includes two interleave boost power factor correction (PFC) converter circuits (a first boost converter circuit 305 and a second boost converter circuit 310) operating 180 degrees out of phase from one another. As described in more detail below, operating the two boost converters 180 degrees out of phase reduces the input-ripple current that the boost inductors may cause and reduces boost inductor magnetic volume. These interleave boost converter circuits may also provide continuous input current, which provides for good PFC. In addition, the boost converter circuits reduce output current ripple to the load (e.g., capacitors and the battery 125, which may be a high voltage battery) and split currents, which reduces copper losses. In addition, the control scheme for the boost converter circuits is moderate in terms of complexity, efficiency, and cost.

The first boost converter circuit 305 includes an inductor 305A, a first transformer current sensor 305B, a second transformer current sensor 305C, a switch 305D (such as, for example, an NPN MOSFET transistor), a resistor 305E, and a diode group 305F. The first boost converter circuit 305 may also be referred to as a step-up converter. In some examples, the first boost converter circuit 305 may boost a DC voltage from 100 Volts to 140 Volts.

Similarly, the second boost converter circuit 310 includes an inductor 310A, a first transformer current sensor 310B, a second transformer current sensor 310C, a switch 310D (in some instances an NPN MOSFET transistor), a resistor 310E, and a diode group 310F. The second boost converter circuit 310 functions similarly to the first boost converter circuit 305 but is 180 degrees out of phase from the first boost converter circuit 305. In some instances, the first boost converter circuit 305 and the second boost converter circuit 310 (e.g., via the sensors 305B, 305C, 310B, and 310C) together form a sensor assembly for measuring a current of the charging circuit 220 (e.g., inductor current). Accordingly, the first boost converter circuit 305, the second boost converter circuit 310, or a combination thereof may be referred to herein as current sensor assembly.

The first boost converter circuit 305 and the second boost converter circuit 310 use multiple inductors and switches to increase the output current while maintaining a low input ripple current. For instance, the first boost converter circuit 305 and the second boost converter circuit 310 may divide the input current into multiple smaller currents and then combine them at an output. This technique reduces the input ripple current and improves charging efficiency and reliability. For instance, the charging circuit 220 may be configured to reduce the input ripple current by interleaving the two inductors (305A and 310A), which may advantageously reduce the size of the inductors and capacitors required. This configuration also improves the efficiency of the charging circuit 220 by reducing the switching losses and may minimize the current stress on the input components.

The charging circuit 220 also includes a control circuit 315, the control circuit 315 including a switch 315A (also referred to as a control switch) configured to be normally close (e.g., in an ON state) during the charging of the battery 125. The control circuit 315 also includes a first resistor 315B, a second resistor 315C, a capacitor 315D, and a control signal 315E. The control signal 315E may be generated by the controller 120 or external hardware. When the current through the first transformer current sensor 305B and the second transformer current sensor 310C reaches close to 0 Amperes (Amps), the controller 120 (or an external circuitry) sends a signal to turn off the switching elements as described below with respect to FIGS. 4A-4B. In some embodiments, the resistor 315B is a sense resistor configured to gauge the flow of current through the control circuit 315. In some instances, the resistor 315B is used to measure the current in the control circuit 315. This measurement may be used to determine the overall current in the charging circuit 220 for a current control strategy. The operation of the control circuit 315 is described in greater detail below with respect to FIGS. 4A and 4B.

The charging circuit 220 also includes an input portion 320, which is split into a positive portion 320A and a negative portion 320B. The positive portion 320A corresponds with a positive EMI signal and the negative portion 320B corresponds with a negative EMI signal. The positive portion 320A and the negative portion 320B together may alternatively be referred to as the input PWM (pulse width modulation) signal. The input portion 320 also includes a first diode group 320C coupled with the positive portion 320A, a second diode group 320D coupled with the negative portion 320B, and a capacitor 320F. At the output side, or output portion 325, the charging circuit 220 includes a first resistor 325A, a second resistor 325B, a first boost output signal 325C (for example, the boost converter's output voltage, the high voltage positive terminal of the battery 125, or the like), a third resistor 325D, a capacitor 325E, and a second boost output signal 325F (for example, the boost converter's output voltage, the high voltage positive terminal of the battery 125, or the like). Coupled to the switch 305D of the first boost converter circuit 305 is a third boost output signal 325G (for example, an electrical ground, the high voltage negative terminal of the battery 125, or the like) and a capacitor 325H.

Figure 4A:
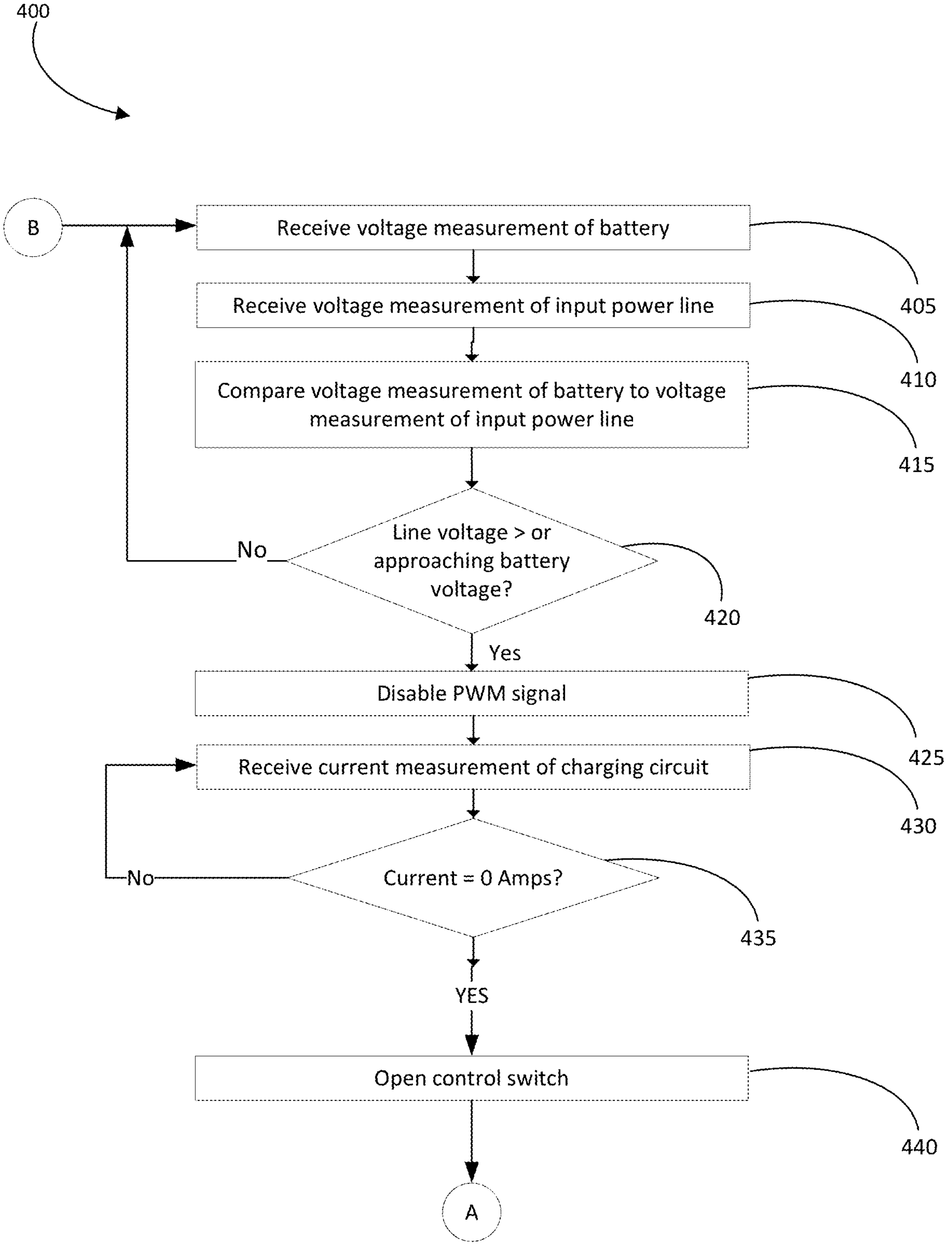
FIGS. 4A and 4B is a flowchart illustrating a process for charging a battery of the electric vehicle performed by the control system of FIG. 2 according to some aspects and embodiments.
Figure 4B:
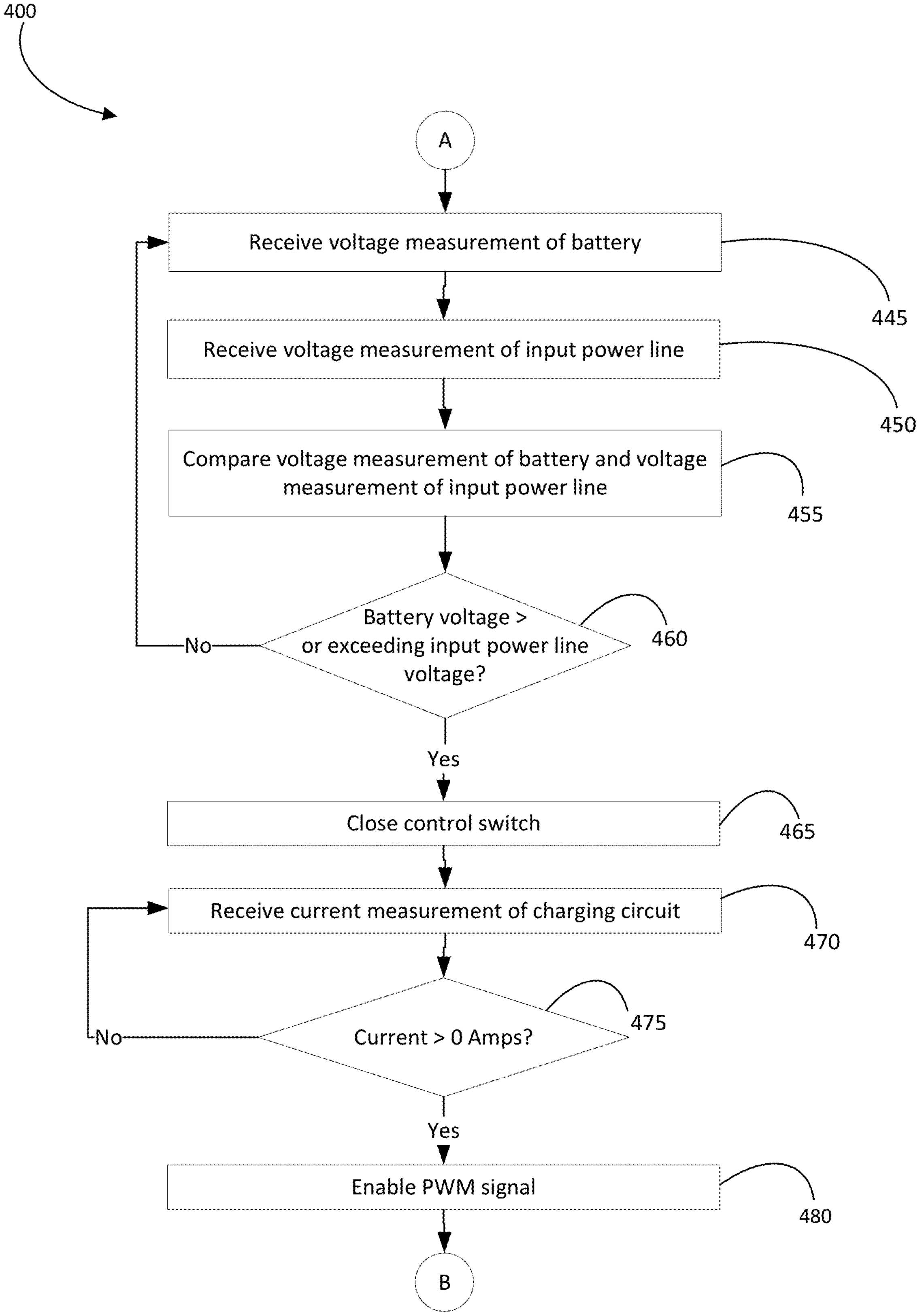

FIGS. 4A and 4B is a flowchart of a method 400 for charging the battery 125 using the charging circuit 220 described above according to some aspects and embodiments. The method 400 may be performed via the controller 120 based on sensor readings provided by the various sensor assemblies and sensing components included in the charging circuit 220. However, as noted above, functionality described herein may be performed by the controller 120, the charging circuit 220, or a combination thereof and may be implemented as software, hardware, or a combination thereof. For example, in some embodiments, the controller 120 is configured (through execution of software instructions) to perform the method 400. It should be understood that blocks of the method 400 may be performed in various orders and, in some embodiments, multiple blocks may be performed in parallel (e.g., through distribution of functionality among multiple electronic processors). Also, in some embodiments, the method 400 may include additional blocks and blocks of the method 400 or the method 400 may be repeated continuously, at a predetermined frequency, in response to one or more triggering events, or a combination thereof.

As illustrated in FIG. 4A, the method 400 includes receiving a measurement of a voltage of the battery 125 (at 405). The method 400 also includes receiving a measurement of the voltage of the input power line 235 (at 410). The voltage measurement of the battery 125 and the voltage measurement of the input power line 235 may be obtained, for example, by the charging circuit 220 using the sensor assemblies described above.

The method 400 further includes comparing the measurement of the voltage of the battery 125 to the measurement of the voltage of the input power line 235 (at 415). In response to determining that the voltage of the input power line 235 is not greater than the voltage of the battery 125 (at 420), the method 400 repeats to continue to receive and compare voltage measurements (at 405, 410, and 415).

Comparing the measured voltage of the battery 125 and the measured voltage of the input power line 235 may involve a direct comparison of voltage values to see whether the line voltage is greater than the battery voltage. Additionally or alternatively, the controller 120 may compare the measured voltage of the input power line 235 to a predetermined threshold, which may be set based on the measured voltage of the battery 125. For example, in some instances, the controller 120 is configured to set the predetermined threshold to a value that is a predetermined number of volts (e.g., approximately 25 Volts) below the voltage of the battery 125. Using this predetermined threshold allows the method 400 to determine when the input power line 235 is approaching the voltage of the battery 125 and take appropriate corrective measures before the input power line 235 reaches or exceeds the voltage of the battery 125. In some embodiments, more than one predetermined amount may be used based on the voltage of the battery 125 to create different values for the predetermined threshold. For example, as the voltage of the battery 125 (or other characteristic, such as, for example, state of charge, etc.) declines, the predetermined amount may increase to account for the drained state of the battery 125 and the potential need to take corrective action sooner.

In response to determining that the voltage of the input power line 235 is greater than the voltage of the battery 125 (or is greater than the predetermined threshold as described above indicating that the input power line voltage is approaching the battery voltage) (at 420), the method 400 includes disabling the PWM signal to the input portion 320 of charging circuit 220 (at 425). For example, the method 400 may disable the PWM signal to the first boost converter circuit 305 and the second boost converter circuit 310. In addition to disabling the PWM signal (at 425), the method 400 also includes receiving a measurement of the current of the charging circuit 220 (at 430). The current of the charging circuit 220 may be, for example, obtained by any one of the current sense transformers (305B, 305C, 310B, 310C) illustrated in FIG. 3. The measurement of the current of the charging circuit 220 is monitored as it diminishes, until the charging circuit 220 current is approximately 0 Amps, and, in response to the charging circuit 220 current being approximately 0 Amps (at 435), the control switch 315A is opened (at 440). Opening this circuit creates an open circuit condition for the circuit 220, which prevents current flow to the battery 125. The control switch 315A of the control circuit 315 portion may be normally closed during charging.

After opening the control switch 315A, the method 400 may continue to monitor the input line voltage and battery voltage to determine when it is appropriate to continue charging the battery 125. In particular, after opening the control switch (at 440), the method 400 includes receiving a measurement of a voltage of the battery 125 (at 445), receiving a measurement of the voltage of the input power line 235 (at 450), and comparing the measurement of the voltage of the battery 125 to the measurement of the voltage of the input power line 235 (at 455) (see FIG. 4B). The method 400 also includes determining whether the voltage of the battery 125 is greater than the voltage of the input power line 235 (at 460). As described above, this comparison may include a direct comparison of the voltage of the battery 125 to the voltage of the input power line 235 (e.g., to determine whether the voltage of the input power line 235 is greater than the voltage of the battery 135) or a comparison of the voltage of the input power line 235 to a predetermined threshold value, which may be set based on the voltage of the battery 125 (e.g., to determine whether the battery voltage is exceeding the power input line voltage enough—e.g., by a predetermined amount to warrant restarting charging). In some embodiments, a different predetermined threshold may be used for detecting when to open a circuit and when to close a circuit. For example, in some embodiments, the predetermined threshold may set to a voltage approximately 25 Volts below the measured battery voltage during active charging (e.g., as part of detecting whether charging should be stopped) and may be set to a different voltage (e.g., approximately 30 or 45 Volts below the measured battery voltage) when charging has been paused (e.g., as part of detecting whether charging should be resumed). It should also be understood that, in some embodiments, the method 400 may use a predetermined threshold when detecting whether charging should be stopped and may use a direct comparison between battery voltage and input line voltage when detecting whether charging should be resumed (or vice versa).

In response to determining that the voltage of the battery 125 is not greater than the voltage of the input power line 235 (or the voltage of the input power line 235 is greater than a predetermined threshold as described above), the method 400 maintains the charging circuit 220 in the open circuit state and continues to measure and compare voltages as described above. Alternatively, in response to determining that the voltage of the battery 125 is greater than the voltage of the input power line 235 (or the voltage of the input power line 235 is not greater than a predetermined threshold), the control switch 315A is closed (at 465) to start the process of returning the charging circuit 220 to a charging state. The method 400 includes receiving a measurement of the current of the charging circuit 220 (at 470). The current of the charging circuit 220 may be, for example, obtained by any one of the current sense transformers (305B, 305C. 310B, 310C) as previously described. The method 400 includes monitoring the measurement of the current of the charging circuit 220 as it increases from 0 Amps. For example, in some embodiments, the method 400 also includes determining if the current of the charging circuit 220 is greater than 0 Amps (at 475). In response to determining the current of the charging circuit 220 is not greater than 0 Amps, the controller 120 may continue to measure the current (at 470). Alternatively, in response to determining that the current of the charging circuit 220 is greater than 0 Amps, the method 400 includes enabling the PWM signal (at 480) to allow nominal charging of the battery 125 of the motorcycle 100. As illustrated in FIGS. 4A and 4B, after returning to a charging state (i.e., in response to enabling the PWM signal), the method 400 may start over to continue to monitor for a condition where the voltage of the input power line 235 exceeds or is approaching the battery voltage.

Thus, embodiments described herein provide a transformerless charging system (e.g., on-board a vehicle) for charging a battery of a vehicle and methods for operating the same. The charging system includes a charging circuit and associated control methods that handle inconsistent grid voltage and, in particular, controls charging when a voltage of the input line (i.e., grid voltage) exceeds or approaches a voltage of the battery. As described above, this circuit and associated control method establishes an open circuit state in the charging circuit to avoid a situation where the voltage of the input line exceeds a voltage of the battery, such as, for example, when the battery reaches a drained state (e.g., 5% to 10% of a full charge). The circuit and associated control method is configured to quickly enact the open circuit condition, such as, for example, it may take approximately 200 microseconds for a battery charging current of 40 Amps to drop to approximately 0 Amps after the PWM is disabled. Other stages, such as opening or closing the control switch 315A, may occur in a similar timeframe. In some instances, the method 400 as described above occurs in approximately 8 milliseconds or less.

The charging systems and methods of operating the same described herein provides advantages over on-board charging system that use a power factor correction stage and a half bridge resonance converter (LLC) including, for example, cost reductions, improved efficiency, and better packaging. As noted above, the systems and methods described here allow the on-board charging system to work over the full range of battery state of charge, such as, for example, without the need for an additional buck converter, which not only saves costs by decreases overall charge time (e.g., by charging with full power over the full range of battery state of charge (0% to 100%).

Although the transformerless charging system and associated control methods have been described in detail with reference to certain preferred embodiments, variations and modifications exist within the scope and spirit of one or more independent aspects of the transformerless charging systems and methods as described. One or more independent features and/or independent advantages of the transformerless charging system and associated control methods may be set forth in the claims.

What is claimed is:

1. A transformerless on-board battery charging system for a vehicle, the system comprising:

a rechargeable battery;

a charging circuit, the charging circuit electrically coupled to the rechargeable battery, the charging circuit including a first switch configured to receive a pulse width modulated (PWM) signal and a second switch;

a first sensor assembly configured to measure a voltage of the rechargeable battery;

a second sensor assembly configured to measure a voltage of an input power line supplying power to the charging circuit from a power supply external to the vehicle;

a third sensor assembly configured to measure a current of the charging circuit; and a controller including an electronic processor configured to:

receive a measurement of the voltage of the rechargeable battery from the first sensor assembly;

receive a measurement of the voltage of the input power line from a second sensor assembly;

compare the measurement of the voltage of the rechargeable battery to the measurement of the voltage of the input power line; and in response to the measurement of the voltage of the input power line being greater than or approaching the measurement of the voltage of the rechargeable battery:

turn off the PWM signal to the first switch, and with the PWM signal to the first switch turned off, receive a measurement of the current of the charging circuit from the third sensor assembly and, in response to the measurement of the current of the charging circuit being approximately 0 Amps, open the second switch.

2. The system of claim 1, wherein the electronic processor is further configured to, with the second switch open and in response to the measurement of the voltage of the rechargeable electric vehicle battery being greater than or exceeding the measurement of the voltage of the input power line by a predetermined amount:

close the second switch; and with the second switch closed and in response to the measurement of the current of the charging circuit being greater than 0 Amps, turn on the PWM signal to the first switch.

3. The system of claim 1, wherein the charging circuit includes a third switch and wherein the electronic processor is configured to, in response to the measurement of the voltage of the input power line being greater than or approaching the measurement of the voltage of the rechargeable battery, turn off the PWM signal to the first switch and the third switch.

4. The system of claim 3, wherein the PWM signal received by the third switch is approximately 180 degrees out of phase from the PWM signal received by the first switch.

5. The system of claim 1, wherein the third sensor assembly includes a current sensor.

6. The system of claim 1, where the electronic processor is configured to turn off the PWM signal to the first switch in response to the measurement of the voltage of the input power line being greater than or approaching the measurement of the voltage of the rechargeable battery by:

comparing the measurement of the voltage of the input power line to a predetermined threshold value, and turning off the PWM signal to the first switch in response to the measurement of the voltage of the input power line being greater than the predetermined threshold value.

7. The system of claim 6, wherein the electronic processor is configured to set the predetermined threshold based on the voltage of the rechargeable electric vehicle battery.

8. The system of claim 7, wherein the electronic processor is configured to set the predetermined threshold to a value a predetermined number of volts below the voltage of the rechargeable electric vehicle battery.

9. The system of claim 8, wherein the predetermined number of volts is 25 Volts.

10. A method of charging an on-board battery for an electric vehicle with a transformerless on-board battery charging system, the method comprising:

receiving, from a first sensor assembly, a measurement of a voltage of a rechargeable electric vehicle battery;

receiving, from a second sensor assembly, a measurement of a voltage of an input power line;

comparing, with an electronic processor, the measurement of the voltage of the rechargeable electric vehicle battery to the measurement the voltage of the input power line; and in response to the measurement of the voltage of the input power line being greater than or approaching the measurement of the voltage of the rechargeable battery:

turning off the PWM signal to the first switch, and with the PWM signal to the first switch turned off, receiving a measurement of the current of the charging circuit from the third sensor assembly and, in response to the measurement of the current of the charging circuit being approximately 0 Amps, opening the second switch.

11. The method of claim 10, wherein the charging circuit includes a third switch and wherein turning off the PWM signal to the first switch in response to the measurement of the voltage of the input power line being greater than or approaching the predetermined threshold value includes turning off the PWM signal to the first switch and the second switch, wherein the PWM signal received by the third switch is approximately 180 degrees out of phase from the PWM signal received by the first switch.

12. The method of claim 10, wherein the first sensor assembly includes a current sense transformer.

13. The method of claim 10, wherein the maximum voltage of the rechargeable electric vehicle battery is approximately 400 Volts.

14. The method of claim 10, wherein the input power line is a sine wave of between approximately-200 Volts and 200 Volts.

15. A transformerless on-board battery charging system for an electric vehicle, the system comprising:

a charging circuit including a first switch configured to receive a PWM signal and a second switch;

a controller including an electronic processor configured to:

receive a measurement of the voltage of a battery;

receive a measurement of a voltage of an input power line; and compare the measurement of the voltage of the rechargeable electric vehicle battery to a predetermined threshold value;

compare the measurement of the voltage of the input power line to the predetermined threshold value; and in response to the measurement of the voltage of the input power line being greater than or approaching the predetermined threshold value:

turn off the PWM signal to the first switch, and with the PWM signal to the first switch turned off, receive a measurement of the current of the charging circuit and, in response to the measurement of the current of the charging circuit being approximately 0 Amps, open the second switch.

16. The system of claim 15, wherein the charging circuit includes a third switch and wherein the electronic processor is configured to, in response to the measurement of the voltage of the input power line being greater than or approaching the predetermined threshold value, turn off the PWM signal to the first switch ad the third switch.

17. The system of claim 16, wherein the PWM signal received by the third switch is approximately 180 degrees out of phase from the PWM signal received by the first switch.

18. The system of claim 15, wherein the second sensor assembly includes a current sensor.

19. The system of claim 15, wherein the maximum voltage of the battery is approximately 400 Volts.

20. The system of claim 15, wherein the input power line is a sine wave of between approximately-200 Volts and 200 Volts.

* * * * *